(12) United States Patent
Hansen (10) Patent No.: US 9,180,949 B2
(45) Date of Patent: Nov. 10, 2015

(54) HUMAN-POWERED WATERCRAFT (71) Applicant: Paul Hansen, Duluth, MN (US)

(72) Inventor: Paul Hansen, Duluth, MN (US)

( * ) Notice: Subject to any disclaimer, the term of this patent is extended or adjusted under 35 U.S.C. 154(b) by 0 days.

(21) Appl. No.: 14/495,571

(22) Filed: Sep. 24, 2014

(65) Prior Publication Data

US 2015/0087195 A1   Mar. 26, 2015

Related U.S. Application Data (60) Provisional application No. 61/882,550, filed on Sep. 25, 2013.

(51) Int. Cl.
*B63H 1/30* (2006.01)
*B63H 16/08* (2006.01)

(52) U.S. Cl.
CPC . *B63H 16/12* (2013.01); *B63H 1/30* (2013.01)

(58) Field of Classification Search
CPC .................................. B63H 1/30; B63H 16/12
USPC ............................................ 440/21; 114/276
See application file for complete search history.

(56) References Cited

U.S. PATENT DOCUMENTS

| | | | | |
|---|---|---|---|---|
| 4,129,912 A * | 12/1978 | Robinson | ..................... | 441/76 |
| 4,349,340 A * | 9/1982 | Hoffmann | ..................... | 440/30 |
| 5,732,502 A | 3/1998 | Hansen | | |
| 6,099,369 A * | 8/2000 | Puzey | ..................... | 440/21 |
| 6,213,830 B1 * | 4/2001 | Robinson | ..................... | 441/65 |
| 6,468,118 B1 * | 10/2002 | Chen | ..................... | 440/21 |
| 6,855,024 B2 * | 2/2005 | Rothschild | ..................... | 441/77 |
| 7,021,232 B2 * | 4/2006 | Chen | ..................... | 114/274 |
| 7,121,910 B2 * | 10/2006 | Rosen | ..................... | 441/76 |
| 7,434,530 B2 | 10/2008 | Chen | | |
| 7,662,004 B1 * | 2/2010 | March et al. | ..................... | 440/14 |
| 7,802,534 B2 * | 9/2010 | Chen | ..................... | 114/274 |
| 7,819,074 B2 * | 10/2010 | Chen | ..................... | 114/274 |
| 8,641,465 B2 * | 2/2014 | Souter | ..................... | 441/66 |
| 2015/0087195 A1 * | 3/2015 | Hansen | ..................... | 440/21 |

* cited by examiner

*Primary Examiner* — Lars A Olson
*Assistant Examiner* — Jovon Hayes
(74) *Attorney, Agent, or Firm* — William Mitchell IP Clinic; Brett A. Klein (57) ABSTRACT

A human-powered watercraft may include a frame, a forward hydrofoil attached to the frame, and a first rear hydrofoil attached to a first strut with the first strut rotatably attached to the frame at a pivot point and the first rear hydrofoil configured to pivot about a rear end of the first strut. The human-powered watercraft may also include a second rear hydrofoil attached to a second strut with the second strut rotatably attached to the frame at the pivot point and parallel to the first strut and the second rear hydrofoil configured to pivot about a rear end of the second strut and a tension system coupled between the first strut and the second strut. The tension system allows the first strut and second strut to move in a generally stair-stepping manner which causes the first rear hydrofoil and the second rear hydrofoil to propel the human-powered watercraft forward.

20 Claims, 4 Drawing Sheets

HUMAN-POWERED WATERCRAFT

CROSS-REFERENCE

This application claims the benefit of U.S. Provisional Application No. 61/882,550 entitled "WATERCRAFT SYSTEM AND METHOD" filed on Sep. 25, 2013, which is incorporated herein by reference in its entirety.

FIELD OF THE DISCLOSURE

The invention relates generally to systems and methods for water transportation and, more particularly, to a human-powered watercraft dependent on hydrofoil lift and propulsion.

BACKGROUND

Water sports are popular, particularly for recreation and as a form of exercise. Few types of watercraft, however, use human power (i.e., work or energy produced from the muscles of the human body). Rowing or paddled watercraft; such as boats, canoes, kayaks, and the like; have traditionally served users wanting to experience the water while getting physical exercise. However, disadvantages exist with paddled or rowing watercraft. Rowing or paddling tends to be quite inefficient as a propulsion method. Moreover, friction or drag associated with the interaction of the watercraft and the water limits achievable speeds.

Reducing the resistance of water against forward motion increases the efficiencies and speeds achievable by watercraft. Hydrofoils reduce this resistance when employed in motor-powered watercraft. Such watercraft use hydrofoils to achieve lift, often raising the watercraft hull completely out of the water. This lifting reduces drag on the watercraft by reducing water resistance.

In nature, applying force to a hydrofoil in a direction generally perpendicular to the water stream is a method of propulsion used by many swimmers. Dolphin, orcas, bluefin tuna, and the like achieve great speeds by applying near perpendicular force to their tails, which act as hydrofoils.

Many human exercise machines employ, among other things, resistance of a user's weight against gravity to produce a desired exercise workout. Examples of popular exercise equipment include stationary bikes, treadmills, stair steppers, and elliptical bikes. However, many of the user-friendly aspects of such equipment are not present in personal, human-powered watercraft, making such watercraft less desirable for exercise use.

SUMMARY

A human-powered watercraft can include a frame, a forward hydrofoil attached to the frame, and a first rear hydrofoil attached to a first strut with the first strut rotatably attached to the frame at a pivot point and the first rear hydrofoil configured to pivot about a rear end of the first strut. The human-powered watercraft can also include a second rear hydrofoil attached to a second strut with the second strut rotatably attached to the frame at the pivot point and parallel to the first strut. The second rear hydrofoil is configured to pivot about a rear end of the second strut. The human-powered watercraft can include a tension system coupled between the first strut and the second strut. The tension system allows the first strut and second strut to move in a generally stair-stepping manner rotatably pivoting about the pivot point which causes the first rear hydrofoil and the second rear hydrofoil to propel the human-powered watercraft forward.

Another embodiment of the watercraft can include a frame, a forward hydrofoil coupled to the frame, a first rear hydrofoil rotatably coupled to a first propulsion strut, and a second rear hydrofoil rotatably coupled to a second propulsion strut. The first propulsion strut and the second propulsion strut are each rotatably coupled to the frame proximate the forward hydrofoil. The watercraft may also include a tension system operatively coupled to the first propulsion strut and to the second propulsion strut to permit movement of the first propulsion strut and the second propulsion strut in a generally stair-stepping motion rotatably pivoting about the frame causing gliding of the first rear hydrofoil and gliding of the second rear hydrofoil to propel the watercraft forward.

A method of making a human-powered watercraft can include providing a frame and attaching a forward hydrofoil to the frame. The method can also include rotatably coupling a forward end of a first strut to the frame at a pivot point with the first strut being attached at a rear end to a first rear hydrofoil and the first rear hydrofoil being configured to pivot about the rear end of the first strut. Additionally, the method can include rotatably coupling a forward end of a second strut to the frame at the pivot point and parallel to the first strut with the second strut being attached at a rear end to a second rear hydrofoil and the second rear hydrofoil being configured to pivot about the rear end of the second strut. The method can also include positioning a tension system between the first strut and the second strut to enable the first strut and the second strut to move in a generally stair-stepping manner rotatably pivoting about the pivot point.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Figure 1:
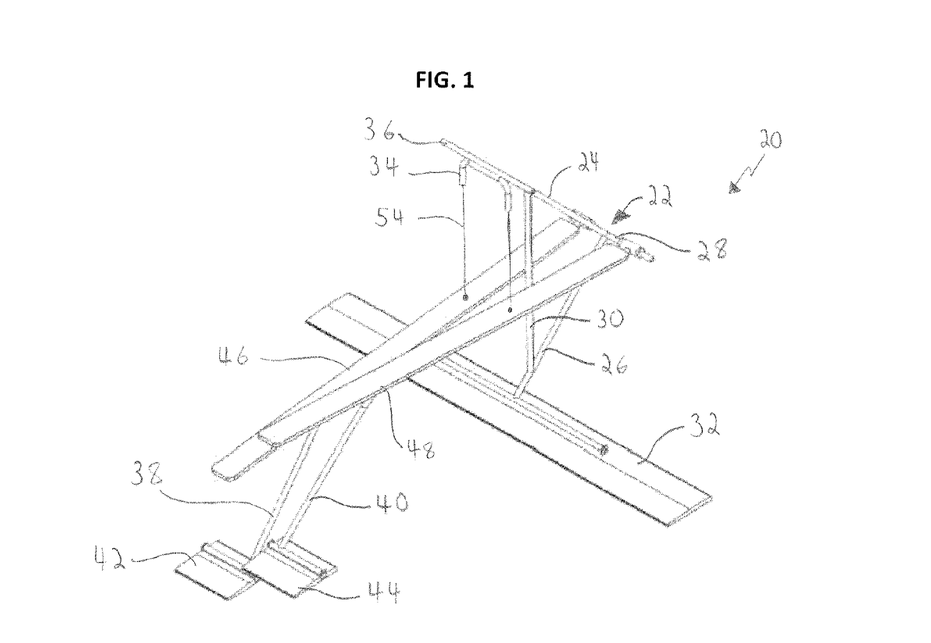
FIG. 1 is a perspective view of a human-powered watercraft.
Figure 2:
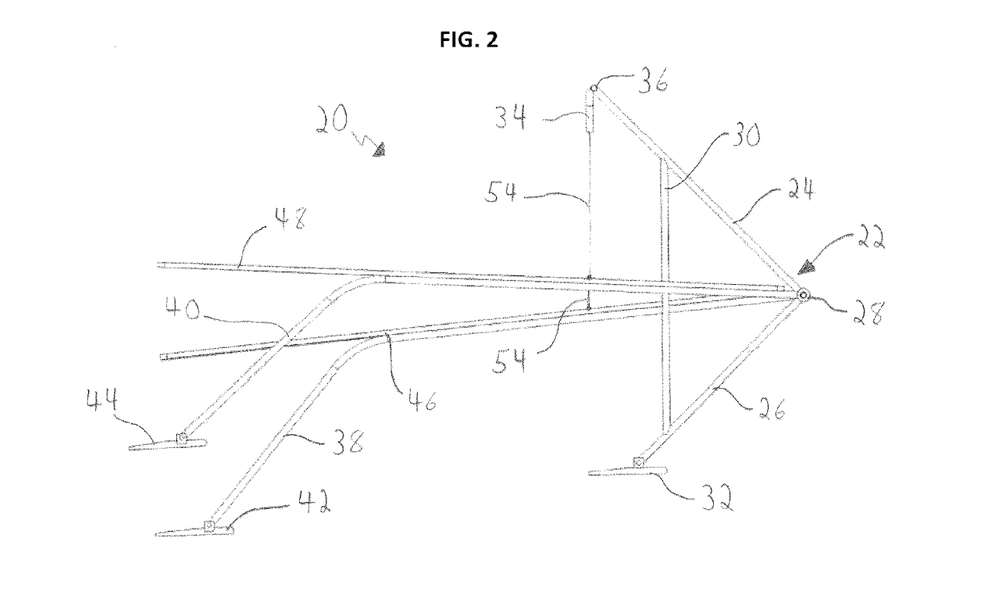
FIG. 2 is a side elevation view of the human-powered watercraft.

FIG. 1 is a perspective view of a human-powered watercraft and FIG. 2 is a side elevation view of the human-powered watercraft. Human-powered watercraft 20 includes frame 22, which includes upward member 24 and downward member 26 that are attached to one another at pivot point 28 (also called an axis). Also part of frame 22 is support brace 30, which is a support connection between upward member 24 and downward member 26. At one end of upward member 24 is tension guide 34 and handlebars 36. Adjacent to one end of downward member 26 is forward hydrofoil 32.

Adjacent to and pivoting about pivot point 28 is first strut 38 (also called first propulsion strut) and second strut 40 (also called second propulsion strut). Located at one end of first strut 38 and second strut 40 is first rear hydrofoil 42 and second rear hydrofoil 44, respectively. On the top side of first strut 38 is first user surface 46, while on the top side of second strut 40 is second user surface 48. Finally, tension system 54 is adjacent to tension guide 34 and connects to first strut 38 and second strut 40.

One structural component of human-powered watercraft 20 is frame 22. Frame 22 includes upward member 24 and downward member 26 attached at pivot point 28 and may also include, but does not have to include in other embodiments, support brace 30. Frame 22 provides structural support and rigidity to human-powered watercraft 20. Frame 22, and most components of human-powered watercraft 20, can be constructed from a number of suitable materials, such as PVC pipe (or PVC pipe filled with buoyant material, such as closed cell insulation), carbon fiber, wood (or rigid installation wood), plastic, aluminum, or other materials and/or can be hollow with buoyant material within so as to ensure that human-powered watercraft 20 floats when in water. Frame 22 can be made from one continuous piece or a number of pieces fastened to one another.

Upward member 24 of frame 22 provides structural support to tension guide 34 and handlebars 36. Upward member 24 angles rearward in human-powered watercraft 20, but in other embodiments can extend vertically straight up or angle forward. Upward member 24 can be one bar or a number of bars that run parallel to one another, arc from pivot point 28 to tension guide 34, or connect to one another in series. At one end, upward member 24 can be connected directly to downward member 26 or can connect to pivot point 28. At the other end, upward member 24 is adjacent to tension guide 34 and handlebars 36.

Downward member 26 of frame 22 provides structural support to forward hydrofoil 32 and, when human-powered watercraft 20 is in use, extends into the water. Downward member 26 can be angled rearward or forward or extend vertically straight down from pivot point 28. Downward member 26 may be a cylindrical bar or another shape that cuts down on drag as at least a portion of downward member 26 moves through the water. Additionally, like upward member 24, downward member 26 can be one bar or a number of bars that run parallel to one another, arc from pivot point 28 to forward hydrofoil 32, or connect to one another in series. At its upper end, downward member 26 can connect directly to upward member 24 or can connect to pivot point 28, while at the other end downward member 26 is adjacent to forward hydrofoil 32.

Between upward member 24 and downward member 26 is pivot point 28, which is the point where upward member 24, downward member 26, first strut 38, and second strut 40 come together. Upward member 24 and downward member 26 in human-powered 20 of FIGS. 1 and 2 do not pivot about pivot point 28, but first strut 38 and second strut 40 do pivot about pivot point 28. Pivot point 28 can be a horizontal bar or another configuration that allows for rotational movement of first strut 38 and second strut 40. Additionally, pivot point 28 can be constructed from the same material(s) as upward member 24 and/or downward member 26 or can be a material more suited to handle the torque imparted on pivot point 28 by human-powered watercraft 20 (by the user shifting weight between first strut 38 and second strut 40). Pivot point 28 can also include screws, pins, or other fasteners that secure the components of human-powered watercraft 20 to pivot point 28.

Providing support to upward member 24, downward member 26, and the rest of human-powered watercraft 20 is support brace 30, which runs between a point along upward member 24 and a point along downward member 26. Other embodiments of human-powered watercraft 20 may not include support brace 30 or can include another configuration to provide support to human-powered watercraft 20. Support brace 30 can be constructed from the same material(s) as the other components of human-powered watercraft 20 or other suitable materials and can have a cylindrical or other cross-section that reduces drag through the water (while in use, the bottom portion of support brace 30 may be in the water). Attached to support brace 30 (as well as upward member 24, downward member 26, pivot point 28, and/or other components of human-powered watercraft 20) can be any suitable floatation devices that provide buoyant lift and ensure that human-powered watercraft 20 floats in water when forward hydrofoil 32, first rear hydrofoil 42, and second rear hydrofoil 44 do not provide sufficient lift to keep human-powered watercraft 20 substantially above the water.

Tension guide 34 is adjacent to one end of upward member 34 and provides a guide for tension system 54 (will be discussed in further detail below). Tension guide 34 can be a hollow, U-shaped tube that allows tension system 54 (usually a line or cable) to slide within tension guide 34, or tension guide 34 can be another configuration that provides a guide for tension system 54. Tension guide 34 can be constructed from PVC pipe, carbon fiber, wood (or rigid installation wood), plastic, aluminum, or other suitable materials. Tension guide 34 can be attached to upward member 24, or upward member 24 and tension guide 34 can be constructed from one piece. Tension guide 34 should be sufficiently strong to handle torque imparted on it by tension system 54 (due to the user shifting his or her weight between first strut 38 and second strut 40).

Handlebars 36 can be adjacent to tension guide 34 and one end of upward member 34 and provides a handle for the user of human-powered watercraft 20. Handlebars 36 can be fastened to tension guide 34 or can be incorporated into tension guide 34 such that the two are one component. Handlebars 36 can be any suitable material or combination of materials and can have grips or other devices to aid the user. Handlebars 36, upward member 24, downward member 26, and forward hydrofoil 32 can be configured to pivot to allow for advanced steering of human-powered watercraft 20, or handlebars 36 can have other steering devices that allow the user to control various steering components of forward hydrofoil 32. Additionally, handlebars 36, upward member 24, downward member 26, and/or forward hydrofoil 32 can be configured to rotate like the steering on a bicycle.

Forward hydrofoil 32 is adjacent to the downward end of downward member 26. Forward hydrofoil 32 is a hydrofoil that can provide upward lift and steering to human-powered watercraft 20. Forward hydrofoil 32 can also provide no lift (just increases stability and steering). While forward hydrofoil 32 of human-powered watercraft 20 is relatively long and extends horizontal in relation to frame 22, other embodiments may have a configuration of forward hydrofoil 32 that is relatively short, non-horizontal, or in multiple pieces (multiple hydrofoils) that are in a row or vertically or horizontally offset. Forward hydrofoil 32 can be made from any suitable materials, such as those discussed in regards to other components of human-powered hydrofoil 20 and/or can be incorporated into a floatation assembly that provides buoyant lift. The steering of forward hydrofoil 32 or other steering components can be "active" in that the steering assembly includes one or more moving parts (e.g., a rudder, steering linkage, etc.). Additionally, human-powered watercraft 20 can be shaped or configured with fins or other fixed or removably fixed devices that act to help promote directional change of human-powered watercraft 20.

Forward hydrofoil 32 can provide lift to help keep the user above the water by adjusting the angle of forward hydrofoil 32 (also called the angle of attack, which is the angle the hydrofoil maintains relative to horizontal). The angle of attack can be adjusted by the user by various means, including the pulling rearward of handlebars 36 (which are attached to frame 20) for an angle adjustment that provides rapid lift or the pushing forward of handlebars 36 for an angle adjustment that provides downward motion of forward hydrofoil 32. Additionally, other means can be utilized to control the angle of attack of forward hydrofoil 32, including the inclusion of ailerons and/or flaps for control and trimming.

Figure 8A:
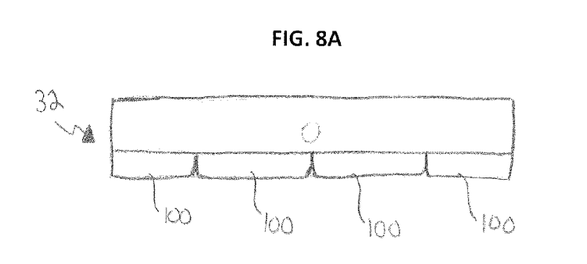
FIG. 8A is an enlarged plan view of one embodiment of the front hydrofoil.
Figure 8B:
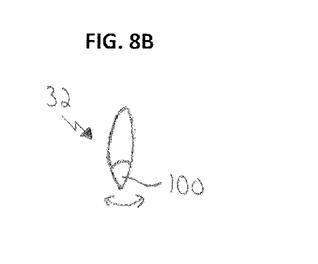
FIG. 8B is an enlarged side view of the embodiment of the front hydrofoil.

As shown in FIGS. 8A and 8B, forward hydrofoil 32 can include a number of ailerons and/or flaps 100 that allow for steering of human-powered watercraft 20. Ailerons and/or flaps 100 pivot about forward hydrofoil 32 and alter the flow of water around forward hydrofoil 32. The controls of ailerons and/or flaps 100 can be attached or housed within frame 22 (such as handlebars 36 or other components) to allow for the user to easily steer human-powered watercraft 20. Other embodiments may not include any moving elements as part of forward hydrofoil 32 and can be steered just by the shifting of weight of the user or by another steering assembly.

First strut 38 and second strut 40 are pivotally attached to pivot point 28 such that first strut 38 and second strut 40 can move upward and downward in a stair-stepping motion when human-powered watercraft 20 is in use. First strut 38 and second strut 40 are mirror images of one another. Both first strut 38 and second strut 40 extend substantially horizontal away from pivot point 28 (when in the rested position and human-powered watercraft 20 is not in use) until the rear portion of first strut 38 and the rear portion of second strut 40 angle downward at a slight decline. First strut 38 and second strut 40 may be made from any suitable materials, such as those discussed in regards to other components of human-powered hydrofoil 20. First strut 38 and second strut 40 should have sufficient strength to handle the force/torque imparted on first strut 38 and second strut 40 by the user during the upward and downward movement of each strut during use of human-powered watercraft 20. Additionally, first strut 38 and second strut 40 can have different configurations in another embodiment, such as an arc or bow that flexes as the user applies force to the particular strut.

On top of and fastened to first strut 38 and second strut 40 is first user surface 46 and second user surface 48, respectively. First user surface 46 and second user surface 48 provide a surface able to support the weight of the user to enable the user to shift his or her weight back and forth from first strut 38 to second strut 40 during the stair-stepped motion used in the operation of human-powered watercraft 20. First user surface 46 and second user surface 48 can extend along the full length of first strut 38 and second strut 40, respectively, or can be just long enough to provide a surface for the user's foot and/or knee. First user surface 46 and second user surface 48 can be made from any suitable materials able to hold the weight of the user, including a softer material that temporarily or permanently forms to the user's foot or knee. In other embodiments, first user surface 46 and second user surface 48 may not be present and the top surfaces of first strut 38 and second strut 40 can be flat and configured to support the weight of the user.

Adjacent to one end of first strut 38 and second strut 40 is first rear hydrofoil 42 and second rear hydrofoil 44, respectively. First rear hydrofoil 42 and second rear hydrofoil 44 provide upward lift when moving forward and/or produce "gliding" of human-powered watercraft 20 through the water. Gliding of human-powered watercraft 20 is measured by the hydrofoils' glide ratio, which is the ratio of the rate of horizontal distance achieved by the hydrofoils relative to the vertical drop in the water by the hydrofoils. When first rear hydrofoil 42 and second rear hydrofoil 44 are gliding through the water, the respective hydrofoil is moving horizontally forward and vertically downward through the water. Thus, human-powered watercraft 20 is elevated (so that human-powered watercraft 20 is substantially above the surface of the water) and propelled forward by first rear hydrofoil 42 and second rear hydrofoil 44 alternately gliding through the stair-stepping motion (described in further detail below in regards to tension system 54).

The cross-sectional shape of first rear hydrofoil 42 and second rear hydrofoil 44 can be configured to provide a particular glide ratio depending on the desired characteristics of human-powered watercraft 20, such as a cross-sectional shape that provides for maximum forward motion (a high glide ratio) or a cross-sectional shape that provides for a maximum lift (a low glide ratio). A more aggressive glide ratio will provide a greater forward thrust, which may be desirable when starting and/or accelerating, whereas a more efficient glide ratio is desire when maintaining a desired cruising speed. Additionally, the angle of first rear hydrofoil 42 and second rear hydrofoil 44 from horizontal (the angle of attack) can be adjusted to provide for a desired glide ratio or the angle can change throughout the up-stroke and down-stroke of the stair-step motion of first strut 38, second strut 40, first rear hydrofoil 42, and second rear hydrofoil 44 (e.g., the angle may vary depending on whether first strut 38 and second strut 40 is weighted by the user, unweighted, partially weight by the user, in an up-stroke, in a down-stroke, in neither an up-stroke nor a down-stroke, etc.). The angle can be varied to about plus or minus ten degrees from horizontal or first rear hydrofoil 42 and second rear hydrofoil 44 may be configured to have an angle more or less than ten degrees, such as three degrees from horizontal. The desired angle may vary during an up-stroke, down-stroke, and/or both or other positions during the stair-step motion of operation of human-powered watercraft 20. The components to control the angle of attack of first rear hydrofoil 42 and second rear hydrofoil 44 can be contained within the particular hydrofoils so as to reduce drag and provide more efficiency.

First rear hydrofoil 42 and second rear hydrofoil 44 provide forward propulsion force by converting the user's applied weight into forward propulsion due to the configuration of each hydrofoil. First rear hydrofoil 42 and second rear hydrofoil 44 support a variable portion of the user's weight depending on the user's location relative to forward hydrofoil 32 and each of first rear hydrofoil 42 and second rear hydrofoil 44. For instance, a larger portion of the user's weight can be applied towards the rear for acceleration due to the application of a greater downward force on first rear hydrofoil 42 and/or second rear hydrofoil 44. Similarly, the user can apply more weight towards the front to balance the user's weight between forward hydrofoil 32, first rear hydrofoil 42, and second rear hydrofoil 44 to achieve maximum efficiency and cruising speed.

While first rear hydrofoil 42 and second rear hydrofoil 44 are relatively short (when compared to forward hydrofoil 32) and extend horizontal in relation to frame 22 in human-powered watercraft 20, other embodiments can have a configuration of first rear hydrofoil 42 and second rear hydrofoil 44 that is relatively long, non-horizontal, or in multiple pieces (multiple hydrofoils) arranged in a row or vertically or horizontally offset. First rear hydrofoil 42 and second rear hydrofoil 44 can be made from any suitable materials, such as those discussed in regards to other components of human-powered hydrofoil 20. First rear hydrofoil 42 can be fastened to first strut 38 and second rear hydrofoil 44 can be fastened to second strut 40 by any suitable fastener, such as a pin, screw, ball bearing, or the like.

Tension system 54 can fasten at one end to first strut 38, loop through tension guide 34, and fasten at the other end to second strut 40 or can form another configuration that ensures that first strut 38 and second strut 40 move together to perform the up-stroke and down-stroke movement (stair-stepping motion) needed to operate human-powered watercraft 20. Tension system 54 maintains the desired relationship between frame 22, first strut 38, and second strut 40. Because tension system 54 can be a cable or line; such as steel, nylon, or other line; that has a specific consistent length, first strut 38 can only move downward when second strut 40 is moving upward, and vice-versa. Therefore, the user must shift his or her weight back and forth from one strut to the other in a stair-stepping motion to produce gliding of first rear hydrofoil 42 (when forced downward) and second rear hydrofoil 44 (when forced downward). When force is imparted onto first strut 38 or second strut 40 by the user (causing first strut 38 or second strut 40 to move downward in a down-stroke), tension system 54 pulls the other strut upward (an up-stroke) so that it is in place for the next cycle of the stair-stepping motion. As mentioned above, the imparting of force onto first strut 38 and second strut 40 causes first rear hydrofoil 42 and second rear hydrofoil 44, respectively, to glide such that human-powered watercraft 20 is elevated substantially above the water and is propelled forward. The length of tension system 54 can be adjusted. By adjusting the length, tension system 54 allows for a change in the relationship of forward hydrofoil 32 in reference to the forward propulsion force provided by first rear hydrofoil 42 and second rear hydrofoil 44. While in forward motion, this relationship is desired to keep the forward propulsion force in line with the path of forward hydrofoil 32 to minimize opposing forces and maximize efficiency and performance.

The upward force needed to keep the user above the surface of the water can be provided both by the lift caused by the gliding of first rear hydrofoil 42 and second rear hydrofoil 44 and by the buoyant forces caused by the addition of floatation devices to human-powered watercraft 20. Human-powered watercraft 20 can be fashioned with a number of joints or other connection points that allow for human-powered watercraft 20 to be collapsed or disassembled for easy transport.

Human-powered watercraft 20 is a recreational watercraft that allows the user to get exercise as he or she easily propels human-powered watercraft 20 through the water. The stair-stepping motion performed by the user to propel human-powered watercraft 20 is more desirable and more easily maintained by the user than other human-powered watercraft. Human-powered watercraft 20 may be constructed in a number of different sizes, shapes, and configurations (e.g., for adult or child users, for experienced or amateur use, for speed, for cruising, for maximum exercise, for minimum effort, to achieve a desired exercise program, for salt or fresh water, for waves or surf, etc.).

FIGS. 3, 4, 5, 6, and 7 are enlarged side views of different embodiments of a rear hydrofoil showing various hydrofoil angle adjustment devices, such as a fastener, adjustment plate, angle control, and/or spring or set of springs.

Figure 3:
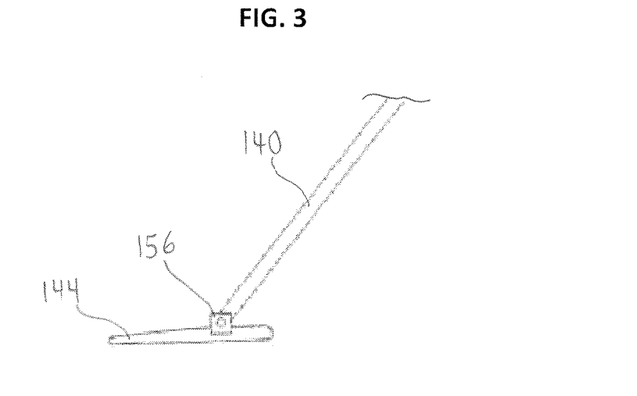
FIG. 3 is an enlarged side view of the rear propulsion hydrofoil.

The human-powered watercraft of FIG. 3 includes second strut 140, second rear hydrofoil 144, and fastener 156. In this embodiment, second strut 140 is connected to second rear hydrofoil 144 by fastener 156, which can be a wheel and pin configuration that allows for adjustment of the angle of second rear hydrofoil 144. Fastener 156 can include pins, flanges, grooves, or other suitable configurations that hold second rear hydrofoil 144 in place. Additionally, the configurations can allow for second rear hydrofoil 144 to move between a number of angles depending on the position in the stair-step motion the hydrofoil is at (depending on whether the hydrofoil is in the up-stroke, down-stroke, etc.). This embodiment, as well as the following embodiments, can also be employed on other hydrofoils of the human-powered watercraft.

Figure 4:
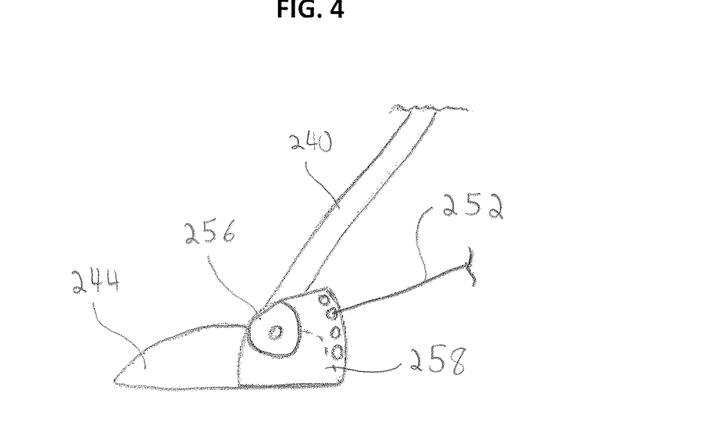
FIG. 4 is an enlarged side view of a second embodiment of the rear propulsion hydrofoil.

The human-powered watercraft of FIG. 4 includes second strut 240, second rear hydrofoil 244, second tension assembly 252, fastener 256, and adjustment plate 258. In this embodiment, fastener 356 may be configured similarly to fastener 156 of FIG. 3 or may be another connection between second strut 240 and second rear hydrofoil 244.

Second tension assembly 252 can extend between pivot point 28 (of human-powered watercraft 20 of FIGS. 1 and 2) or one end of second strut 240 and adjustment plate 258 (there can also be a first tension assembly that mirrors second tension assembly 252 and performs the same functions). Second tension assembly 252 can be rigid or flexible like wires or lines; such as steel, nylon, or fishing line; that provides support to second strut 240, respectively, during use of human-powered watercraft 20. Additionally, second tension assembly 252 can be used to control the angle of second rear hydrofoil 244. The torque imparted by second tension assembly 252 on second strut 240, adjustment plate 258, and second rear hydrofoil 244 may vary depending on the particular circumstances involved (e.g., the torque may vary depending on whether second strut 240 is weighted by the user, unweighted, partially weight by the user, in an up-stroke, in a down-stroke, in neither an up-stroke nor a down-stroke, etc.).

Second strut 240 can be configured with second tension assembly 252 to form a bow-like construction in which flexibility of second strut 240 can result in an increase in the tension in second tension assembly 252. The increase in tension can provide for varying torques upon second rear hydrofoil 244 to adjust the angle of attack.

Adjustment plate 258 can be adjacent to fastener 256, at one end of second rear hydrofoil 244, or have another configuration that allows for attachment of second tension assembly 252 to adjustment plate 258. Second tension assembly 252 can attach to adjustment plate 258 at a number of different locations (connection points) to provide for adjustment of the angle of second rear hydrofoil 244 and/or the tension of second tension assembly 252. Adjustment plate 258 can be made from any suitable materials, such as those discussed in regards to other components of human-powered hydrofoil 20, and can allow for attachment of second tension assembly 252 by any fastener, such as a bolt, pin, or the like.

Figure 5:
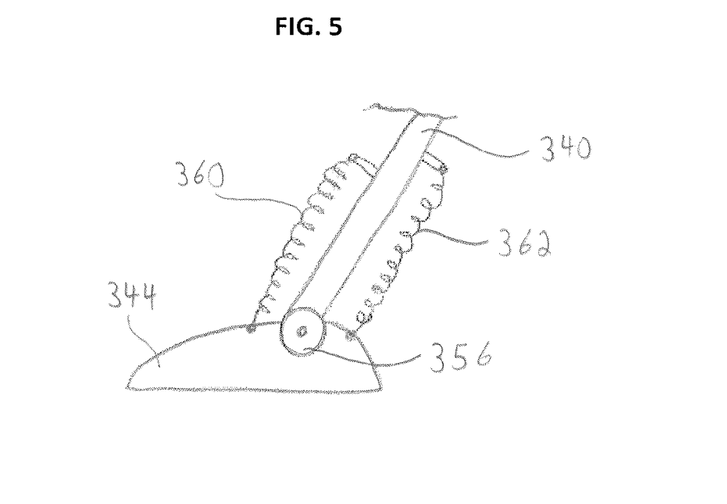
FIG. 5 is an enlarged side view of a third embodiment of the rear propulsion hydrofoil.

The human-powered watercraft of FIG. 5 includes second strut 340, second rear hydrofoil 344, fastener 356, outer spring 360, and inner spring 362. In this embodiment, outer spring 360 and inner spring 362 are each attached at one end to second strut 340 and at the other end to second rear hydrofoil 344. Outer spring 360 and inner spring 362 work together to ensure the desired angle of second rear hydrofoil 344 is achieved, usually through the exertion of tensile and/or compressive force upon second rear hydrofoil 344. While outer spring 360 and inner spring 362 are shown in FIG. 5 as springs, outer spring 360 and inner spring 362 can have a variety of configurations (other than a spring) and be made from a variety of different materials. The connections of outer spring 360 and inner spring 362 can be configured so as to slide across second strut 340 and allow for the adjustment of the resistance of outer spring 360 and inner spring 362 depending on the desired angle of second rear hydrofoil 344. Additionally, another embodiment may include only one of outer spring 360 and inner spring 362.

Figure 6:
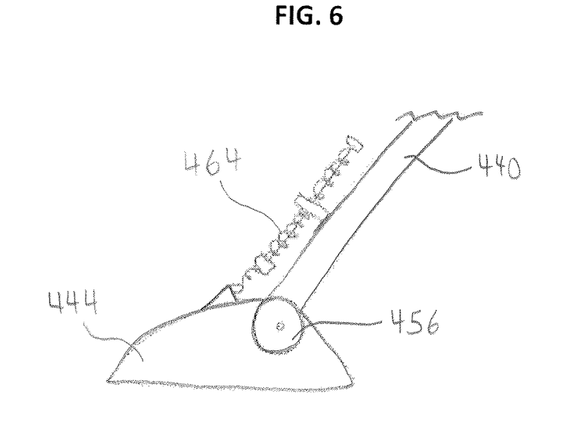
FIG. 6 is an enlarged side view of a fourth embodiment of the rear propulsion hydrofoil.

The human-powered watercraft of FIG. 6 includes second strut 440, second rear hydrofoil 444, fastener 456, and angle control 464. Angle control 464 is attached to second strut 440 and second rear hydrofoil 444 and can include a spring, multiple springs, or other components that control/adjust the angle of second rear hydrofoil 444. Angle control 464 can control or allow the adjustment of the angle of second rear hydrofoil 444, usually by a compressive force as a result of a spring or other resilient material attached between an anchor on second strut 440 and second rear hydrofoil 444.

Figure 7:
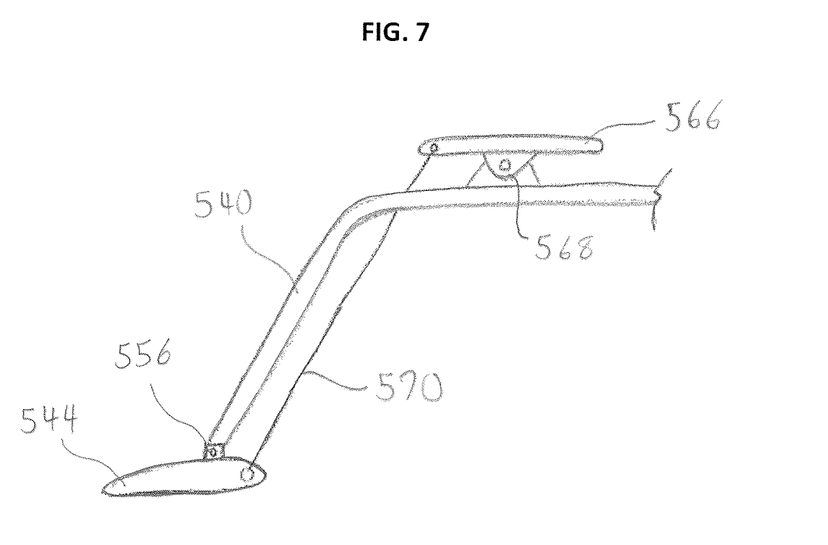
FIG. 7 is an enlarged side view of a fifth embodiment of the rear propulsion hydrofoil.

The human-powered watercraft of FIG. 7 includes second strut 540, second rear hydrofoil 544, fastener 556, footpad 566, fulcrum 568, and coupler 570. Footpad 566 can be located on the top side of second strut 540 and pivotally connected to second strut 540 by fulcrum 568 or can be incorporated into second user surface 48 (shown in FIGS. 1 and 2). Footpad 566 can be made from the same material as first user surface 46 and second user surface 48 on human-powered watercraft 20 or another suitable material that provides a surface for the foot of the user.

Fulcrum 568 connects footpad 566 to second strut 540 and allows for footpad 566 to pivot about fulcrum 568 when the user's foot introduces weight to the front or rear portion of footpad 566. Fulcrum 568 can be any suitable connection, such as a pin connector or another fastener.

Connected between the rear portion of footpad 566 and second rear hydrofoil 544 is coupler 570. Coupler 570 can be a rigid link or a flexible connection, such as a line or cable. When the user introduces weight to the front portion of footpad 566, footpad 566 pivots about fulcrum 568 and causes the rear portion of footpad 566 to pull on coupler 570, which then causes coupler 570 to affect the angle of second rear hydrofoil 544. The introduction of weight to the rear portion of footpad 566 can cause coupler 570 to push on second rear hydrofoil 544 and affect the angle of attack. This allows for the user to adjust the angle of attack with his or her foot. Such a configuration could also be used with another mechanism, such as a spring.

The configuration of footpad 566, fulcrum 568, and coupler 570 can also be configured to function with first strut 38 and first rear hydrofoil 42. Additionally, the embodiments of FIGS. 3, 4, 5, 6, and 7 can each be combined with one another or all together to provide control of the angle of the rear hydrofoils. Other embodiments not specifically disclosed are also envisioned, for it will be understood by those skilled in the art that various changes may be made and equivalents may be substituted for elements thereof without departing from the scope of the invention. All components used to provide structural support and/or control and adjustment of first rear hydrofoil 42 and second rear hydrofoil 44 can be configured to be internal to the hydrofoils to reduce drag on human-powered watercraft 20 and make it more efficient.

Figure 9:
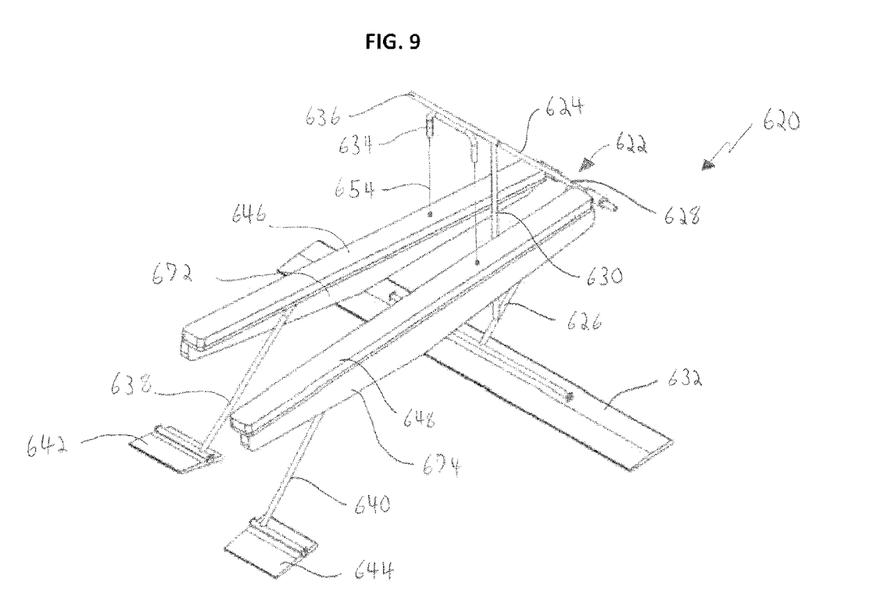
FIG. 9 is a perspective view of another embodiment of the human-powered watercraft.

FIG. 9 is a perspective view of another embodiment of the human-powered watercraft. Human-powered watercraft 620 includes frame 622, which includes upward member 624 and downward member 626 that are attached to one another at pivot point 628. Also part of frame 622 is support brace 630, which is a support connection between upward member 624 and downward member 626. At one end of upward member 624 is tension guide 634 and handlebars 636. Adjacent to one end of downward member 626 is forward hydrofoil 632.

Adjacent to and pivoting about pivot point 628 is first strut 638 and second strut 640. Located at one end of first strut 638 and second strut 640 is first rear hydrofoil 642 and second rear hydrofoil 644, respectively. On the top side of first strut 638 is first user surface 646, while on the top side of second strut 640 is second user surface 648. Tension system 654 is adjacent to tension guide 634 and connects to first strut 638 and second strut 640. Human-powered watercraft 620 is similar to human-powered watercraft 20 of FIGS. 1 and 2, but human-powered watercraft 620 also includes first buoyant device 672 and second buoyant device 674 that provide flotation to human-powered watercraft 620. First buoyant device 672 and second buoyant device 674 can be made from any suitable material. While first buoyant device 672 is positioned adjacent to first strut 638 and second buoyant device 674 is positioned adjacent to second strut 640, the buoyant devices can be positioned at various places on human-powered watercraft 620, including on frame 622. First buoyant device 672 and second buoyant device 674 can be of varying buoyancies, such as a configuration where the buoyancy of one buoyant device equals or exceeds about one half or more of the user's weight to allow for human-powered watercraft 620 to stay above the water when the user is on, but not operating, human-powered watercraft 620.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A human-powered watercraft comprising:
   a frame;
   a forward hydrofoil attached to the frame;
   a first rear hydrofoil attached to a first strut, the first strut rotatably attached to the frame at a pivot point and the first rear hydrofoil configured to pivot about a rear end of the first strut;
   a second rear hydrofoil attached to a second strut, the second strut rotatably attached to the frame at the pivot point and parallel to the first strut, the second rear hydrofoil configured to pivot about a rear end of the second strut; and a tension system coupled between the first strut and the second strut to enable the first strut and the second strut to move in a generally stair-stepping manner rotatably pivoting about the pivot point which causes the first rear hydrofoil and the second rear hydrofoil to propel the human-powered watercraft forward.

2. The human-powered watercraft of claim 1, wherein application of weight back and forth between the first strut and second strut causes the generally stair-stepping manner.

3. The human-powered watercraft of claim 1, wherein the tension system comprises a line that connects to each of the first strut and the second strut and wraps around the frame.

4. The human-powered watercraft of claim 1, wherein the tension system is adjustable.

5. The human-powered watercraft of claim 1, wherein the first strut and the second strut each include a surface on a top side configured to hold the weight of a human.

6. The human-powered watercraft of claim 1, further comprising:
    a first tension assembly between a point on the first strut adjacent the pivot point and the first rear hydrofoil; and
    a second tension assembly between a point on the second strut adjacent the pivot point and the second rear hydrofoil.

7. The human-powered watercraft of claim 6, wherein the first tension assembly and the second tension assembly are lines.

8. The human-powered watercraft of claim 6, wherein the first tension assembly and the second tension assembly are removably attachable to the first rear hydrofoil and the second rear hydrofoil at a plurality of connection points in order to allow adjustment of an angle of each hydrofoil.

9. The human-powered watercraft of claim 1, further comprising:
    a first angle adjustment device adjacent to the first rear hydrofoil; and
    a second angle adjustment device adjacent to the second rear hydrofoil.

10. The human-powered watercraft of claim 9, further comprising
    a first line between a point on the first strut adjacent the frame and the first angle adjustment device; and
    a second line between a point on the second strut adjacent the frame and the second adjustment device.

11. The human-powered watercraft of claim 9, wherein the first angle adjustment device is a first resilient material attached between the first strut and the first rear hydrofoil and the second angle adjustment device is a second resilient material attached between the second strut and the second rear hydrofoil.

12. The human-powered watercraft of claim 1, wherein the forward hydrofoil is able to rotate about the frame to steer the human-powered watercraft.

13. The human-powered watercraft of claim 1, further comprising:
    a buoyant device adjacent to the frame, first strut, and second strut.

14. The human-powered watercraft of claim 1, wherein the forward hydrofoil includes at least one movable flap that allows for steering of the watercraft.

15. A method of making a human-powered watercraft, the method comprising:
    providing a frame;
    attaching a forward hydrofoil to the frame;
    rotatably coupling a forward end of a first strut to the frame at a pivot point, the first strut being attached at a rear end to a first rear hydrofoil, the first rear hydrofoil configured to pivot about the rear end of the first strut;
    rotatably coupling a forward end of a second strut to the frame at the pivot point and parallel to the first strut, the second strut being attached at a rear end to a second rear hydrofoil, the second rear hydrofoil configured to pivot about the rear end of the second strut; and
    positioning a tension system between the first strut and the second strut to enable the first strut and the second strut to move in a generally stair-stepping manner rotatably pivoting about the pivot point.

16. The method of claim 15, wherein the tension system comprises a line that connects to each of the first strut and the second strut and wraps around the frame to form an inverted U shape.

17. The method of claim 15, further comprising:
    connecting a first tension assembly between a point on the first strut adjacent the pivot point and the first rear hydrofoil; and
    connecting a second tension assembly between a point on the second strut adjacent the pivot point and the second rear hydrofoil.

18. The method of claim 17, wherein the first tension assembly and the second tension assembly are removably attachable to the first rear hydrofoil and the second rear hydrofoil at a plurality of connection points in order to allow adjustment of an angle of each hydrofoil.

19. The method of claim 15, further comprising:
    attaching a first angle adjustment device to the first rear hydrofoil; and
    attaching a second angle adjustment device to the second rear hydrofoil.

20. The method of claim 15, further comprising:
    attaching a first surface on a top side of the first strut; and
    attaching a second surface on a top side of the second strut, wherein the first surface and second surface are configured to hold the weight of a human.

\* \* \* \* \*